(12) United States Patent
Boettcher et al.

(10) Patent No.: US 8,038,381 B2
(45) Date of Patent: Oct. 18, 2011

(54) ARRANGEMENT AND METHOD FOR LOADING VEHICLE BODIES

(75) Inventors: Lothar Boettcher, Leipzog (DE);
Christoph Beerhalter, Lorch (DE);
Guenther Wittenmayer, Hemminger (DE); Guenther Wolf, Bietigheim (DE);
Claus-Peter Krause, Fellbach (DE);
Eckhard Uebach, Freundenberg-Heisberg (DE)

(73) Assignees: Dr. Ing. h.c.F. Porsche Aktiengesellschaft (DE); ILS Industrie Logistic Swiss AG (CH)

( * ) Notice: Subject to any disclaimer, the term of this patent is extended or adjusted under 35 U.S.C. 154(b) by 311 days.

(21) Appl. No.: 12/479,990

(22) Filed: Jun. 8, 2009

(65) Prior Publication Data

US 2009/0248197 A1 Oct. 1, 2009

Related U.S. Application Data

(62) Division of application No. 10/961,367, filed on Oct. 12, 2004, now Pat. No. 7,547,183.

(30) Foreign Application Priority Data

Oct. 9, 2003 (DE) .................................... 10347609

(51) Int. Cl.
*B65G 67/02* (2006.01)
*B65H 31/30* (2006.01)
(52) U.S. Cl. ........................ 414/809; 414/400
(58) Field of Classification Search .................. 29/430; 410/26, 43; 414/183, 222.12, 267, 281, 331.01, 414/332, 373, 392, 400, 789.9, 790.6, 794.9, 795.2, 799, 809, 927; 53/249, 250, 251, 253, 473; 700/115, 214, 217, 218
See application file for complete search history.

(56) References Cited

U.S. PATENT DOCUMENTS

| | | | |
|---|---|---|---|
| 3,212,654 A | 10/1965 | Dolphin | |
| 4,652,205 A | 3/1987 | Ross et al. | |
| 5,577,597 A | 11/1996 | Kakida et al. | |
| 5,953,234 A | 9/1999 | Singer et al. | |
| 6,148,291 A | 11/2000 | Radican | |
| 6,619,907 B1 | 9/2003 | Pajot | |
| 7,547,183 B2 * | 6/2009 | Boettcher et al. | 414/789.9 |
| 2005/0102813 A1 * | 5/2005 | Boettcher et al. | 29/428 |

FOREIGN PATENT DOCUMENTS

| | | |
|---|---|---|
| DE | 3616484 | 11/1987 |
| DE | 20220470 | 9/2003 |
| DE | 20220469 | 10/2003 |
| GB | 1505992 A * | 4/1978 |

\* cited by examiner

*Primary Examiner* — Gregory Adams
(74) *Attorney, Agent, or Firm* — Gerald E. Hespos; Michael J. Porco

(57) ABSTRACT

An arrangement is provided for loading vehicle bodies in which assembled vehicle bodies are continuously made available from a production process for loading and are prepared for the loading. Several different stations of the loading arrangement are mutually coordinated and monitored by a control unit. A drive operated fork lift is utilized to handle empty cargo carriers and to stack a pair of vehicle body loaded cargo carriers to form a loading unit which is subsequently transferred to a transport train freight car.

15 Claims, 4 Drawing Sheets

ARRANGEMENT AND METHOD FOR LOADING VEHICLE BODIES

CROSS-REFERENCE TO RELATED APPLICATIONS

This application is a divisional of U.S. patent application Ser. No. 10/961,367 filed on Oct. 12, 2004. Application Ser. No. 10/961,367 claims the priority of German Application No. 103 47 609.1 filed Oct. 9, 2003, the disclosure of which is expressly incorporated by reference herein.

BACKGROUND OF THE INVENTION

It has been sufficiently known to load completely assembled vehicles for a further transport on freight cars and to implement the transport by rail vehicles. In this case, the completely assembled vehicles can be rolled onto the freight cars and, because of their own damping, can be transported there without the risk of torsion.

From German Registered Utility Patent DE 202 20 470 U1, a transport device is known on which a preassembled constructional unit of a vehicle (body) without a chassis can be transported between mutually remote production sites. Such a transport device has the advantage that fixing and supporting devices between the base frame of the transport device and a frame floor of the preassembled vehicle body permit a transport on a transport vehicle, such as the freight cars of a rail vehicle.

SUMMARY OF THE INVENTION

It is an object of the invention to provide an arrangement for loading vehicle bodies by means of which, at the end of their assembly, the vehicle bodies can be received from the production process in a simple manner and can be prepared for a loading onto a transport vehicle. For this purpose, the vehicle bodies are to be placed on cargo carriers, as known, for example, as a transport device from the above-mentioned German Patent Document DE 202 20 470 U1.

Advantages achieved by means of certain preferred embodiments of the invention essentially are that the assembled vehicle bodies, which are continuously available from the production process for loading, are continuously removed after their final inspection and prepared for the loading, even if no transport vehicle is available for a final removal.

The use of cargo carriers, onto which the vehicle bodies are placed, advantageously ensures that the vehicle bodies are protected from damage as a result of vibrations and torsion on the transport vehicle.

According to certain preferred embodiments of the invention, the individual stations of the loading arrangement are mutually coordinated such and are monitored by a central control unit that purely automated processes and manual processes alternate, and the safety of the persons who carry out the manual processes is simultaneously ensured. The use of light barriers and sensors for recognizing end positions and for securing dangerous areas has the advantage that automatic processes are stopped when another process has not yet been concluded and that a warning signal takes place.

According to certain preferred embodiments of the invention, all information is conducted to a control unit which monitors the implementation of the individual operating steps.

Furthermore, it is advantageous according to certain preferred embodiments of the invention, that all vehicle bodies are provided with an identification number, so that information is available in the control unit at any time as to which vehicle body is just being loaded and at which site it is located in the transport vehicle. Likewise, each freight car is provided with an identification number. Therefore, precisely that vehicle body which is loaded into it can be assigned to each freight car. This has the advantage that, when the freight car is later unloaded, the exact sequence of the vehicle bodies can be maintained for the feeding to the further production.

The individual operations sequence and working stations will be explained in detail in the following by means of the figures.

Other objects, advantages and novel features of the present invention will become apparent from the following detailed description of the invention when considered in conjunction with the accompanying drawings.

DETAILED DESCRIPTION OF THE DRAWINGS

Figure 1:
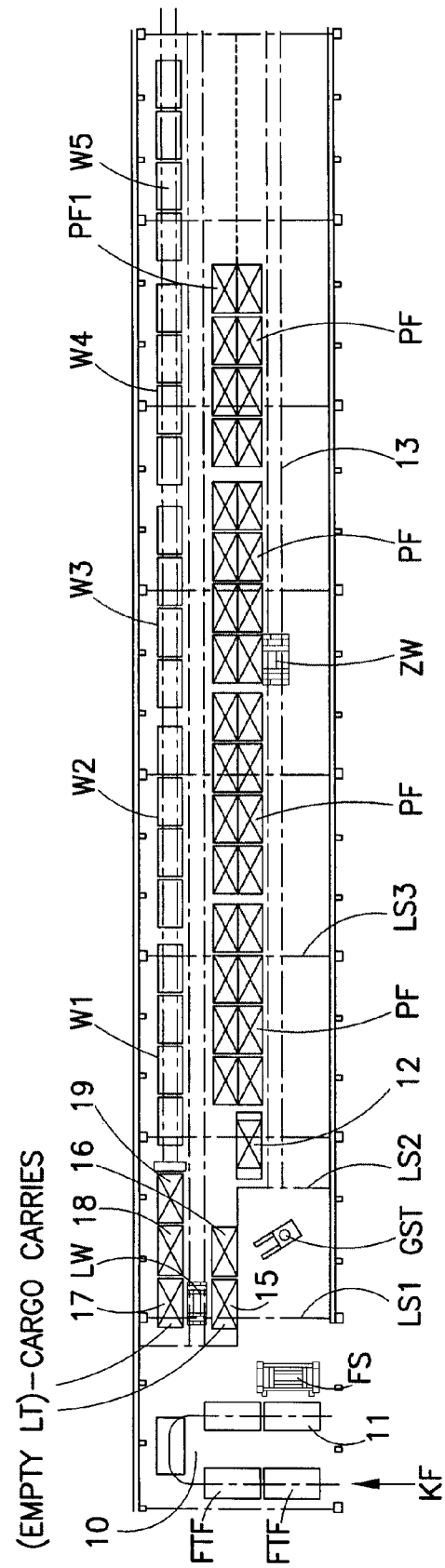
FIG. 1 is a schematic overview of the arrangement for the loading of vehicle bodies in accordance with a preferred embodiment of the present invention.

FIG. 1 is a schematic overview of the loading arrangement, in which case, on the left side of the representation, the completely assembled vehicle bodies are continuously removed from the vehicle body production. The individual vehicle bodies are disposed on driverless carrier vehicles FTF and are subjected here in section 10 to a final check. For the purpose of simplification, the individual vehicle bodies on the driverless carrier vehicles FTF are not explicitly shown. In reality, however, a completely assembled vehicle body will be present on each driverless carrier vehicle, which vehicle body is subjected to its final inspection at this final control check 10. If the vehicle body to be checked is in order, the checking personnel will issue a release signal for the loading, and the driverless carrier vehicle FTF with the vehicle body drives into the final position 11 of section 10. A control unit, which is not shown and in which all individual operations are detected and controlled, takes over the further procedure.

The lifting truck HUB, which is arranged below the end position 11, lifts the entire system FTF and the vehicle body to such an extent that a gripper, which is not shown and which is situated above the lifting truck HUB, can receive the vehicle body. The lifting truck HUB is lowered again and the driverless transport vehicle FTF can be driven out of the area 10 and again be available in the production of the individual vehicle bodies.

Figure 4:
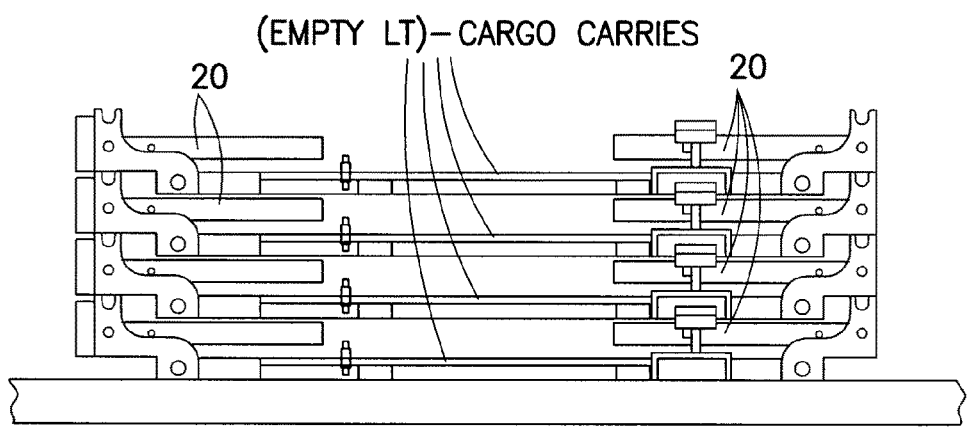
FIG. 4 is a view of stacked empty cargo carriers for use with the system of FIGS. 1 and 2.

Before the gripper, which is not shown, continues to move together with the vehicle body, the control unit carries out a check as to whether an empty cargo carrier empty-LT is present in a joining station FS on the output side. The joining station FS forms the technical interface between the delivery of the vehicle bodies from the production process by the FTF and the depositing of the vehicle bodies in a cargo carrier as the smallest shipping unit. For preparing the joining station FS for receiving a vehicle body, a manually controlled fork lift GST fetches an empty cargo carrier empty LT from a corresponding buffer. For providing cargo carriers, several buffer sites 15, 16, 17, 18 and 19 are situated in an area of the loading arrangement, at which buffer sites empty cargo carriers are stacked. The cargo carriers, which are essentially known from German Patent Document 202 20 470 U1, are illustrated in FIG. 4 in a stacked form with folded-down supporting columns 20. The exact construction will not be explained here. The fork lift driver fetches one cargo carrier respectively from these buffer sites and inserts it in the joining station FS. By means of sensors, a correct position of the cargo carrier is determined in the joining station and a corresponding release signal is emitted. If the cargo carrier is correctly disposed in the joining station, the fork lift will drive back behind a light barrier LS1. The driver of the fork lift is therefore no longer in the possible swiveling range of the gripper for the transfer of the vehicle body from the FTF. In the interim, the elevating platform HUB has moved into the transfer position for the gripper, in which case here also the upper lifting position is confirmed by position sensors. Subsequently, the gripper takes up the vehicle body and moves it into the position of the joining station, where it places it on the cargo carrier. When the vehicle body is disposed on the cargo carrier, the gripper opens up and releases the vehicle body. In addition to having the basic function of the gripping for transferring the finished vehicle body from the FTF to the cargo carrier, the gripper should also be available for a case in which disturbances occur in the vehicle body transfer. In this case, a lifting-back of the vehicle body takes place. If the vehicle body has been transferred at the joining stations, the gripper moves back and the light barrier LS1 is switched off, which is signaled by a corresponding green light signal for the fork lift driver. The fork lift driver GST now drives into this range, picks up the cargo carrier with the vehicle body disposed on it and, with the cargo carrier and the vehicle body, drives to a stacking station 12. Before the fork lift inserts the cargo carrier into the stacking station 12, it folds up the lateral supporting columns 20 which are locked in this folded-up position by a corresponding mechanism.

Various conditions have to be met for depositing the individual cargo carriers with the vehicle bodies in the stacking station 12. First, it has to be checked whether the stacking station is in its normal position. In this case, a release signal is emitted and alight barrier LS2 is switched inactive, which, in turn, is signaled to the fork lift driver by a light signal. Simultaneously, it is ensured that a feeding carriage ZW does not drive into the range of the stacking station. This can take place, for example, by a third light barrier LS3 which, when crossed by the feeding carriage ZW, emits a signal to the control unit, which is not shown, so that the later will then stop the feeding carriage ZW. The fork lift GST can now drive into the range of the stacking station 12 and place the first vehicle body with its cargo carrier in the stacking station 12. When the fork lift GST has left the range again and is situated outside the light barrier LS2, this range is again in a safety mode and the stacking module 12 can lift the first vehicle body. As soon as the cargo carrier with the vehicle body is in the uppermost lifting position of the stack module, another cargo carrier with a vehicle body, which in the interim had been taken over according to the above-described sequence from the end position 11 and had been received by the fork lift from the joining station FS, can be inserted into the stacking station 12. hen this cargo carrier is also properly disposed in the stacking station, the first inserted and lifted upper cargo carrier is lowered, o that they stand on one another in an accurately fitting manner. The two cargo carriers LT with the vehicle bodies K correctly form a loading unit LE. Subsequently, the fork lift leaves the safety range again and is situated between the light barriers LS1 and LS2. In FIG. 1, the stacking module is shown only from the bird's-eye view, so that here the individual lifting movements cannot be seen.

Figure 2:
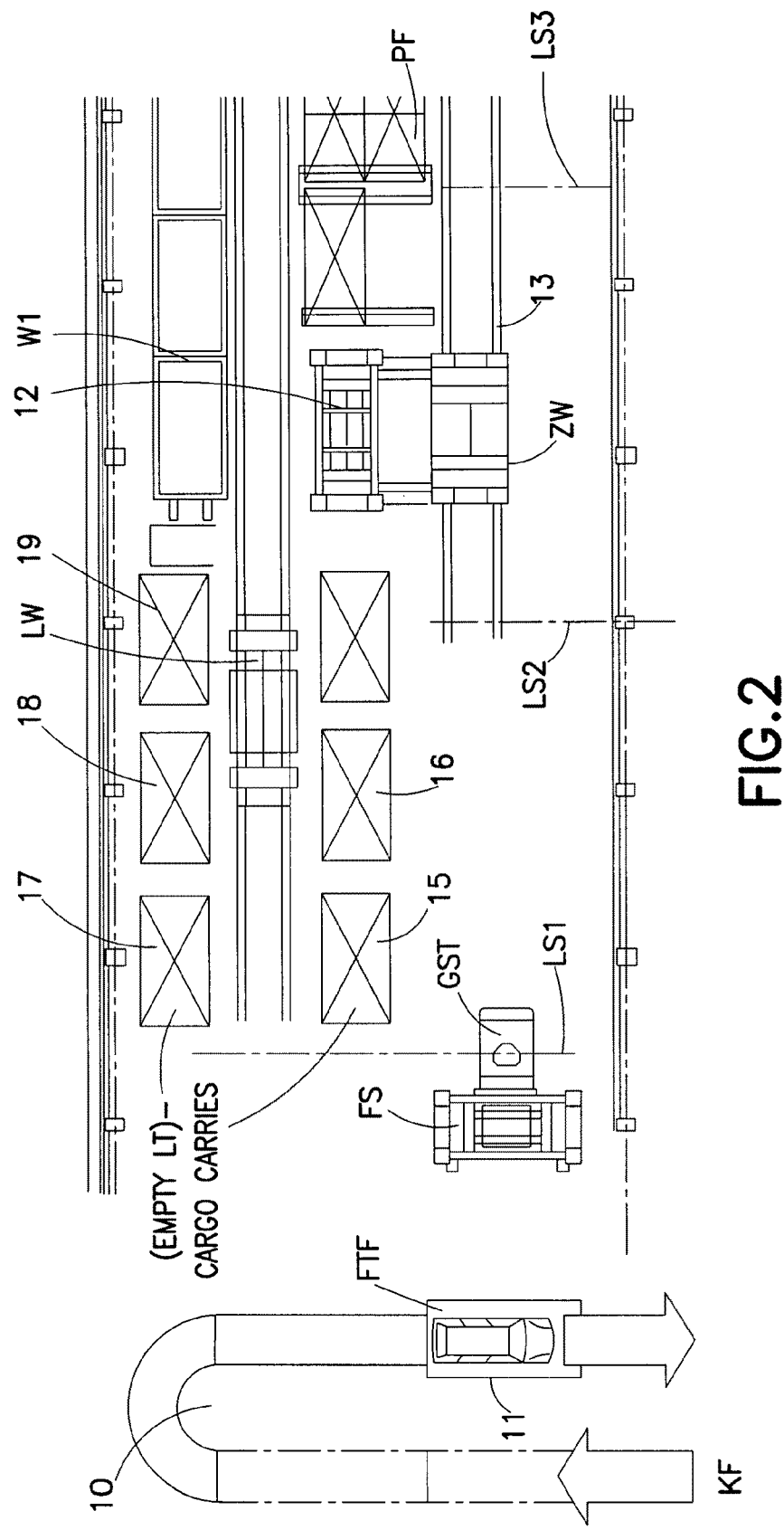
FIG. 2 is a view of the transfer of the vehicle bodies from the production line to a stacking station using the system of FIG. 1.
Figure 3:
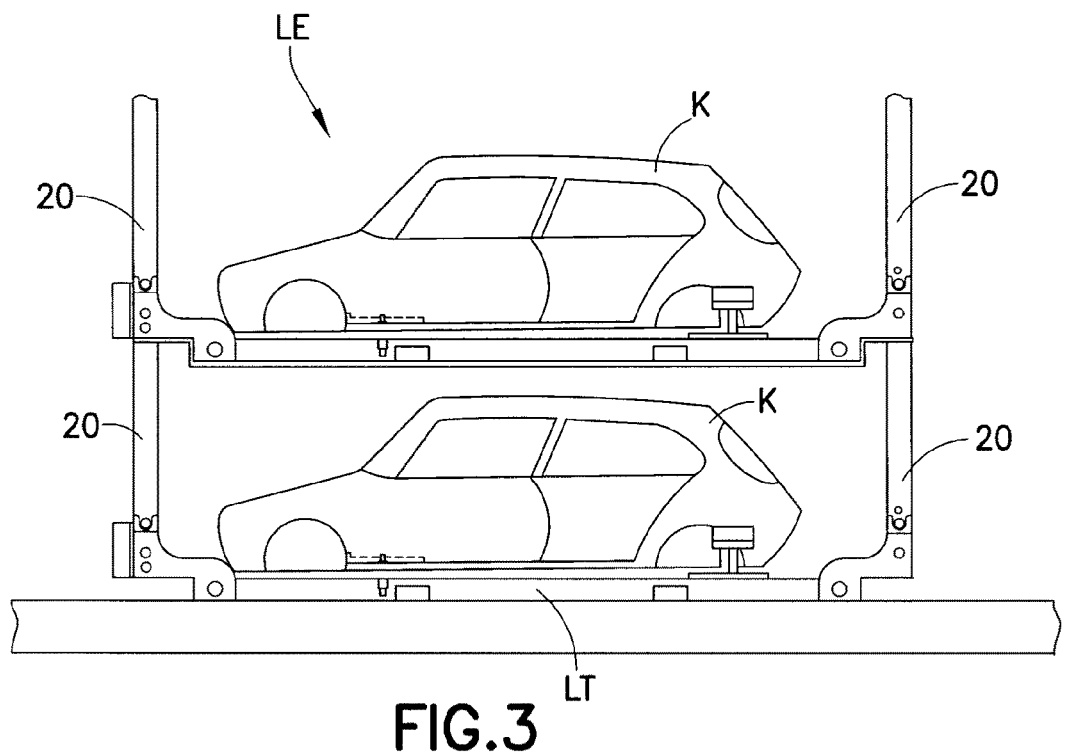
FIG. 3 is a view of a loading unit consisting of two cargo carriers with vehicle bodies for use with the system of FIGS. 1 and 2.

The above-described sequence is again illustrated in FIG. 2, the same devices and arrangements being provided with identical reference symbols. In contrast to FIG. 1, the fork lift here is in the position in front of the joining station FS for taking over a cargo carrier with the vehicle body, and the feeding carriage ZW is situated opposite the stacking station 12 for receiving a loading unit LE, as illustrated in FIG. 3. Depending on the transport vehicle, the lateral supporting columns 20 of the upper cargo carrier can be folded up, as illustrated in FIG. 3 or can remain in the folded-away condition.

This loading unit LE is fetched by a feeding carriage ZW from the stacking station. It is a prerequisite in this case that the light barrier LS2 is switched active and the fork lift is not in the range in which the feeding carriage is moving. The feeding carriage itself runs on rails 13 which, as illustrated in FIG. 1, extend along the entire loading arrangement. The feeding carriage ZW drives to the level of the stacking station 12, so that, in its longitudinal orientation, it stands beside the stacking station. The feeding carriage has lifting forks, which can be guided in and out, as well as chain conveyors, by means of the lifting forks, the feeding carriage reaching under the lower cargo carrier and lifting the loading unit LE consisting of the two cargo carriers in the vertical direction, so that subsequently, the chain conveyer permits a driving-back of the cargo carriers on the feeding carriages. Then, the feeding carriage ZW travels on the rails to a free buffer site, of which there are essentially as many as freight cars can then maximally be loaded. In FIG. 1, the buffers sites have the reference symbol PF.

The feeding carriage ZW starts with the depositing of the loading unit LE at the buffer site PF most remote from the stacking station 12. In a case in which all buffer sites are vacant, this would be buffer site PF1.

A loading carriage LW moves parallel to feeing carriage ZW on the opposite side of the buffer sites. This loading carriage also runs on rails. All operating steps are monitored by a control unit which knows the momentary occupancy of the buffer sites and which detects the coming-in of the train consisting of several closed freight cars W1, W2, W3, W4 and W5 for the loading. The loading carriage LW has the function of checking by means of a sensor system, after the coming-in of the train and the manual opening of the freight car doors, whether all freight cars are in fact empty.

Since the cargo carriers are required for the transport of the vehicle bodies and have to be carried away with the vehicle bodies, the empty stacked cargo carriers are simultaneously returned by the train. The loading carriage LW will therefore simultaneously detect in which of the freight cars the mutually stacked empty cargo carriers are deposited. During its return travel from checking the freight cars to its starting point 14, the loading carriage will remove these empty cargo carriers empty-LT from the freight cars and correspondingly deposit them at the sites 15, 16, 17, 18 or 19 provided for this purpose.

The loading of the freight cars then starts in that the buffer sites PF occupied first are unloaded first and the freight car W5 which came in last is loaded first. For this purpose, the loading carriage LW moves to the level of the buffer PF1 and grips the loading unit LE, the receiving again taking place by way of known lifting trucks and chain conveyors, On the loading carriage itself, sensors are provided which, during the loading, detect the height of the freight car and the central alignment of the loading carriage with respect to the freight car. Subsequently, the loading carriage moves out its extension arms such that the loading unit can be moved into the freight car by way of chain conveyors.

It was found to be advantageous to load all freight cars first from one side, for example, the right side, and to then close the doors for all freight cars in such a manner that now only the left side is opened. Then the loading of the left side of the freight cars takes place.

At any time, the control unit knows the actual position of the individual cargo carriers with the vehicle bodies, of the feeding carriage, of the loading carriage and of the freight cars. Each vehicle body and each freight car is equipped with a transponder, so that by way of sensors, the exact position can be detected and assigned. It is therefore precisely known in the transport protocol in which freight car which vehicle body is transported, so that, during a later unloading, the freight cars will be available precisely in the sequence in which the vehicle bodies are to be provided for the production.

As indicated above, a central, not explicitly shown control unit is provided which monitors the individual sequence steps. In the control unit, different conditions are filed for each action to be carried out, which conditions have to be met before another action is triggered.

Figure 5:
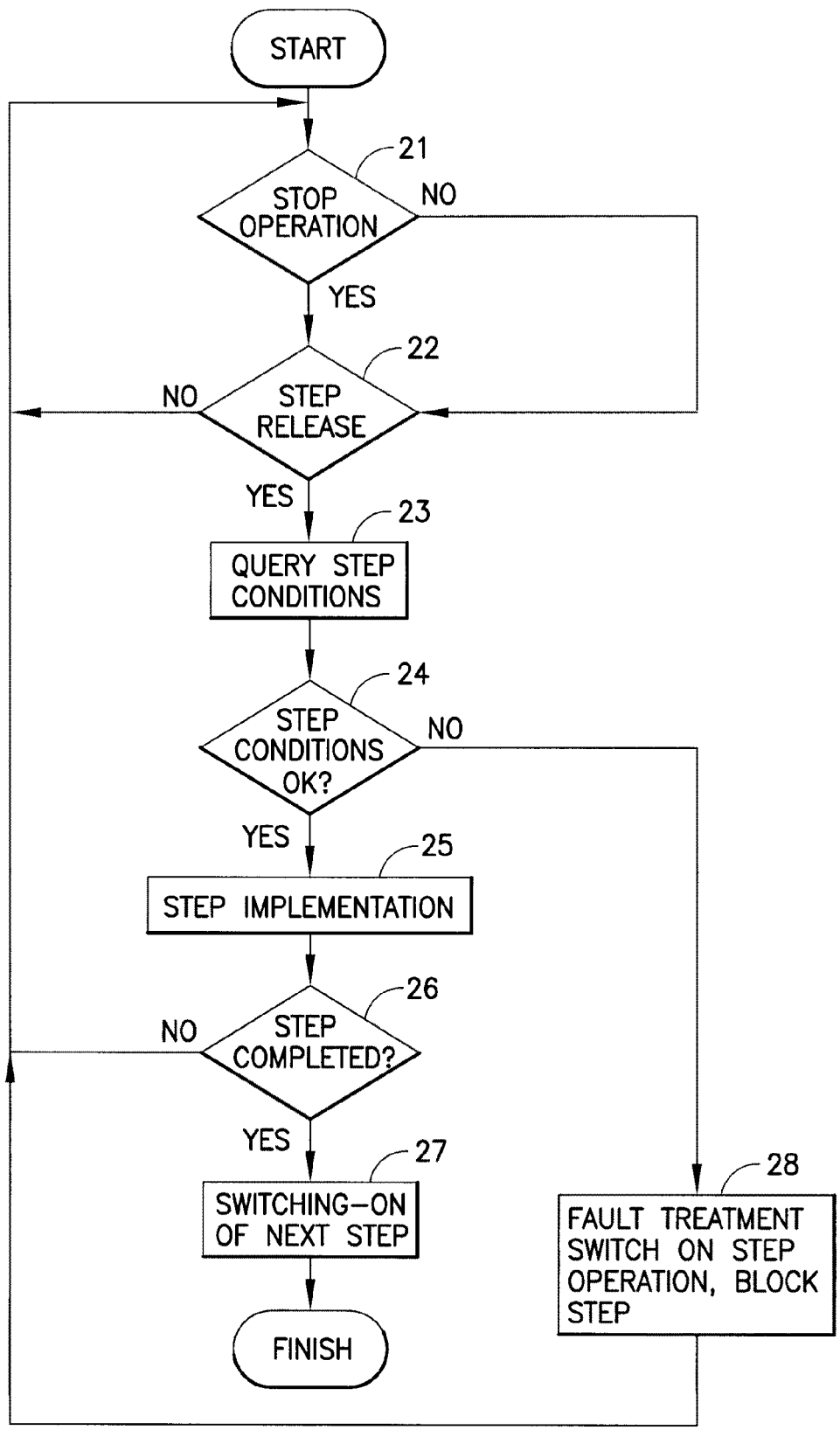
FIG. 5 is a description of functions of program steps for the system of FIGS. 1-4.

FIG. 5 illustrates such an internal query in the control system as a flow chart. This flow chart can essentially be applied to all operating steps to be triggered. After the START, it is first queried in step 21 whether a peripheral unit, such as the feeding carriage, is in a step operation. If a step operation is activated, it is checked in the operating step 22 whether a step release is to take place. If this is not so, a return takes place to operating step 21. Simultaneously, if no step operation was activated in operating step 21, as in the case of a positive reply to query 22 whether a step release is to take place, in a subsequent operating step 23, the conditions for a step release are retrieved from a corresponding memory section in the control system, so that it can be checked in the subsequent query 24 whether the conditions exist for the step release, for example, whether a fork lift driver is no longer in the range of the stacking station and, in the stacking station, two cargo carriers with vehicle bodies are combined to a loading unit LE. If this is so, the step is implemented in operating step 25. If the conditions have not been met, a fault detection takes place in operating step 28 and the step operation is blocked. In operating step 26 of the flow chart, it is checked whether the implemented step is completed. If this is so, subsequently, in operating step 26, the next step to be implemented is switched on and the program starts again. If no complete implementation of the step to be implemented could be detected in the operating step, the procedure returns to operating step 21.

As a result, it is ensured that a movement is stopped if the conditions change during the implementation and persons or objects may possibly be endangered.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of handling wheelless vehicle bodies supplied by a production process, comprising:
   transporting a vehicle body to a production end position on a transport device,
   utilizing a lifting device for lifting the vehicle body from the transport device,
   providing a buffer site with a plurality of empty cargo carriers,
   providing a joining station adjacent the lifting device,
   providing a stacking station spaced from the joining station,
   providing a gripper openable to grip respective vehicle bodies on the lifting device,
   utilizing a driver operated fork lift to move empty cargo carriers from the buffer site to the joining station,
   using the gripper to move the vehicle body from the lifting device to the empty cargo carrier at the joining station, and
   using the driver operated fork lift to stack a pair of vehicle body loaded cargo carriers on top of one another at the stacking station to form a loading unit.

2. A method according to claim 1, wherein said lifting device and gripper are automatically controlled by a control unit.

3. A method according to claim 1, comprising utilizing a movable feeding carriage to move the loading units from the stacking station to respective loading buffer sites.

4. A method according to claim 3, comprising utilizing a loading carriage to transfer loading units from the respective loading buffer sites to respective transport train freight cars.

5. A method according to claim 4, wherein said lifting device and gripper are automatically controlled by a control unit.

6. A method according to claim 5, wherein the feeding carriage and loading carriage are automatically controlled by the control unit.

7. A method according to claim 1, wherein light sensors and warning means are provided to guide the fork lift driver and prevent collisions with the automatically operated mechanisms of the lifting device and gripper.

8. A method for transferring vehicle bodies from an end of a production line to freight cars, the freight cars being arranged on a substantially linear freight car track segment having a leading end in proximity to the end of the production line and a trailing end remote from the production line, the method comprising:
   transferring a first of said cargo carriers from a cargo carrier buffer site in proximity to a leading end of the freight car track segment to a joining station in proximity to the end of the production line;
   transferring a first vehicle body from the end of the production line to the first cargo carrier at the joining station;
   transferring the first cargo carrier and the first vehicle body from the joining station to a stacking station;
   transferring a second of said cargo carriers from the cargo carrier buffer site to the joining station;
   transferring a second of the vehicle bodies from the end of the production line to the second cargo carrier at the joining station;
   transferring the second cargo carrier and the second vehicle body thereon to the stacking station and into stacked engagement with the first cargo carrier and the first vehicle supported thereon to define a load unit;
   moving said load unit parallel to the freight car track segment;
   moving the load unit toward the freight car track segment and into a vehicle body buffer site;

moving a loading carriage along a loading carriage track substantially adjacent and parallel to the freight car track segment and into a position aligned with the vehicle body buffer site having the load unit therein;

transferring the load unit onto the loading carriage and into a position between the vehicle body buffer site and the freight car track segment;

moving the loading carriage parallel to the freight car track segment and into a position aligned with one of said freight cars that can accommodate the load unit; and moving the load unit from the loading carriage onto the selected freight car.

9. The method of claim 8, wherein at least one of the freight car carries at least one empty cargo carrier configured for supporting one of said vehicles, the method further comprising;

moving the loading carriage into a position along the loading carriage track and into a position aligned with the said freight car having said empty cargo carrier therein;

moving the empty cargo carriage from the freight car onto the loading carriage;

moving the loading carriage along the loading carriage track and to the cargo carrier buffer site; and transferring the empty cargo carrier from the loading carriage to the cargo carrier buffer site.

10. The method of claim 8, further comprising elevating at least one of said first and second cargo carriers at the stacking station, aligning the first and second cargo carriers vertically with one another and lowering the elevated cargo carrier for engaging the first and second cargo carriers with one another to produce the load unit.

11. The method of claim 8, further comprising generating a joining station signal after the step of transferring the vehicle body to the respective cargo carrier at the joining station and then transferring the respective cargo carrier and the vehicle body to the stacking station after receipt of the joining station signal.

12. The method of claim 8, further comprising moving the load unit from the stacking station to a feeding carriage, the step of moving said load unit parallel to the freight car track segment comprises moving the feeding carriage with the load unit thereon parallel to the freight car track segment.

13. The method of claim 12, further comprising generating a feeding carriage signal when the feeding carriage is within a specified distance from the stacking station for indicating when the step of moving the loading unit to the feeding carriage can be carried out.

14. The method of claim 8, further comprising elevating the first cargo carrier and the first vehicle body at the stacking station, transferring the second cargo carrier and the second vehicle body thereon into a position beneath the elevated first cargo carrier and first vehicle body and lowering the first cargo carrier and the vehicle body into a stacked array to produce the load unit.

15. The method of claim 14, further comprising generating a stacking signal when the first cargo carrier and the first vehicle have been elevated sufficiently to receive the second cargo carrier and the second vehicle beneath the first cargo carrier and the first vehicle.

\* \* \* \* \*